3,180,855
HALO-SILANES AS ACTIVATORS FOR THE POLYMERIZATION OF PYRROLIDONE

William B. Black, Decatur, Ala., assignor, by mesne assignments, to Monsanto Company, a corporation of Delaware
No Drawing. Filed Sept. 25, 1958, Ser. No. 763,207
21 Claims. (Cl. 260—78)

This invention relates to a new process for polymerizing pyrrolidone. More particularly, the invention is concerned with a new polymerization procedure for the manufacture of pyrrolidone polymers, wherein new catalyst-activator systems are employed.

Pyrrolidone is normally polymerized in the presence of a polymerization catalyst, such as the alkali metals and various organic metallic compounds, as well as sodium amide, calcium oxides and hydroxides, and the like. It has been found that the activity of these catalysts during the polymerization reaction can be enhanced by the addition thereto of various compounds which are classed as polymerization activators. For example, among the compounds heretofore proposed as polymerization activators, there may be named the acyl compounds, such as acetyl pyrrolidone, acetyl morpholine, benzoyl chloride and the like; lactones, such as gamma butyrolactone, and the like; alkyl esters of mono- and dicarboxylic acids, such as ethyl acetate, ethyl oxalate, and the like; and the esters of polyhydric alcohols, such as ethylene glycol diacetate, and the like. However, the presently known catalyst-activator systems for the polymerization of pyrrolidone leave much to be desired.

Many of the compounds heretofore proposed as polymerization activators for pyrrolidone polymerization are difficult to handle, which obviously makes them undesirable from a commercial standpoint. Furthermore, many of the prior art compounds proposed as activators tend to affect the polymers as they are formed, resulting in undesirable color and in detrimental changes in physical properties of the polymers. In addition, many of the prior art compounds introduce end groups into the polymer chains which decrease the dye receptivity thereof. Furthermore, many of the prior art activators result in the production of polymers having relatively low specific viscosities. Shaped articles, such as fibers, for example, formed from such polymers are weak and cannot be drawn to any given degree. Accordingly, there has been a need in the art for catalyst-activator systems which overcome the above disadvantages and which are easily and readily adaptable to a commercial operation.

It is a principal object of the present invention to provide new catalyst-activator systems for the polymerization of pyrrolidone. It is another object of the invention to provide new catalyst-activator systems for the polymerization of pyrrolidone which result in the formation of polymers having desired improved physical properties, such as good solubility, excellent color and high molecular weight. It is another object of the invention to provide new catalyst-activator systems for the polymerization of pyrrolidone which result in the formation of polymers having greatly improved dyeability. It is a further object of the invention to provide a new process for preparing pyrrolidone polymers. Other objects and advantages of the invention will be apparent from the description thereof hereinafter.

In general, the objects of the invention are accomplished by polymerizing monomeric pyrrolidone under polymerization conditions in the presence of a polymerization catalyst and a polymerization activator containing at least one silicon-halogen bond.

Any organic or inorganic silicon compound containing at least one halogen atom bonded directly to the silicon atom may be utilized as a polymerization activator in the practice of the present invention. Among the more common and preferred silicon compounds useful in this invention, there may be named tetrachlorosilane, alpha, beta-dichloroethyltrichlorosilane, bis(chloromethyl) methylchlorosilane, butyltrichlorosilane, chloromethylmethyldichlorosilane, dichloromethyldimethylchlorosilane, diethyldichlorosilane, dimethyldichlorosilane, diphenyldichlorosilane, ethyltrichlorosilane, methyltrichlorosilane, phenyltrichlorosilane, propyltrichlorosilane, trimethylchlorosilane, vinyltrichlorosilane, allylmethyldichlorosilane, allyltrichlorosilane, allyltrimethylsilane, chlorophenyltrichlorosilane, gamma chloropropyltrichlorosilane, alpha chlorovinyltrichlorosilane, dichlorophenyltrichlorosilane, ethyldichlorosilane, beta-phenylethyltrichlorosilane, bis(trichlorosilyl) ethane, bis(trichlorosilyl) ethylene, bis(trichlorosilyl) benzene, and the iodo- and bromo-forms of the above compounds, and the like. Further silicon compounds useful as activators are silicon bromotrichloride, silicon bromodichloride, silicon tribromochloride, silicon trichloride, silicon iodotrichloride, silicon sulfachloride, and the iodo- and bromo-forms of any of the above-mentioned compounds and the like.

The polymerization activators may be utilized with any of the known catalysts normally employed in the polymerization of monomeric pyrrolidone. Among the catalysts for polymerizing pyrrolidone which may be employed in the practice of the present invention, there may be named the alkali metals, that is, sodium, potassium, and lithium; the hydrides, hydroxides, oxides and salts of the alkali metals, that is, such salts as sodium, potassium and lithium pyrrolidone; organic metallic compounds, preferably those which are strongly basic, for example, the lithium, potassium and sodium alkyls and the aryls of the alkali metals, such as sodium phenyl and the like; sodium amide, and other catalysts.

Preparation of polypyrrolidone with the activators of this invention may be carried out with varying amounts of components. In general, the chemical equivalent amount of catalyst must exceed by at least a slight excess the number of chemical equivalents of activator. The catalysts may be employed in a range of 0.002 to 0.25 chemical equivalent of catalyst based upon 1 mole of monomeric pyrrolidone. It is preferred, however, that the catalyst be employed in a range of 0.005 to 0.25 chemical equivalent of catalyst based upon 1 mole of monomeric pyrrolidone. The activator may be employed in a range of 0.0001 to 0.075 chemical equivalent of activator based upon 1 mole of monomeric pyrrolidone. Preferably, however, the activator is employed in a range of 0.001 to 0.075 chemical equivalent of activator based upon 1 mole of monomeric pyrrolidone. Thus, for activators containing more than 1 potentially reactive substituent on the silicon atoms, the maximum number of moles of activator that may be employed for a given number of moles of catalyst must be considerably less than the number of moles of catalyst. For example, where one mole of vinyltrichlorosilane (three chemical equivalents) is employed in carrying out the polymerization, a slight excess of three moles (three chemical equivalents of catalyst) is required.

The polymerization reaction of this invention is carried out at temperatures within a range of —70° C. to 100° C. In the preferred practice of the invention, however, the polymerization reaction is carried out at a temperature in the range of 20° C. to 70° C. The reaction time will vary with the temperature and the amount of monomer employed. Where higher temperatures are used in the polymerization reaction, the total time required to complete polymerization is shorter. The polymerization period is also greatly affected by the particular catalyst-activator system employed. Generally, in carrying out a polymerization reaction according to the present invention, the monomer, catalyst, and activator are placed in a polymerization vessel and subjected to polymerization temperatures as hereinabove defined. However, the steps necessary to obtain complete polymerization will vary, depending upon the type of catalyst which is employed. For example, many of the catalysts, such as sodium hydroxides, cause the formation of water during the polymerization reaction. The presence of such water has a deleterious effect upon the polymerization reaction, namely, it hinders further polymerization and even brings the same to a halt in many instances. Accordingly, in order to achieve the desired results, it is necessary to remove such water of reaction from the reaction medium. This can easily be accomplished by a simple vacuum distillation. Therefore, when employing a catalyst such as sodium hydroxide, the monomeric pyrrolidone is placed in the polymerization vessel and the catalyst added thereto. The reactants are then subjected to vacuum distillation and mechanical stirring in order to remove the water formed. Although mechanical stirring is not absolutely necessary, it greatly aids in removal of the water. When all of the water in the reaction vessel is completely removed, the activator is then added to the reaction mixture and the reaction continued. When an alkali hydride is employed as the catalyst, all of the reactants may be added to the polymerization vessel simultaneously and thereafter the reaction carried through to completion. However, it is preferred to add the alkali hydride to the monomer in the reaction vessel and then remove the hydrogen thus generated prior to the addition of the activator to the reaction mass. This procedure eliminates all danger of any possible explosive results due to the presence of hydrogen in the reaction mixture. An advantage of the use of an alkali hydride over the water-forming catalysts, such as sodium hydroxide, is the elimination of the distillation step necessary for removal of the water of reaction, since with hydrides a pyrrolidone salt and gaseous hydrogen are formed.

The instant method for polymerizing pyrrolidone may be carried out by either solution, emulsion, suspension, or bulk polymerization techniques. The solution and emulsion polymerizations may be either batch or continuous methods. When solution polymerization is employed, the monomeric pyrrolidone is dissolved in a solvent such as 1,4-dioxane. The desired catalyst and activator are added to the solution and the polymerization is carried out under the proper conditions. Well-known solution polymerization apparatus is suitable for carrying out the methods employed in the practice of this invention. When applying emulsion or suspension polymerization procedures to the preparation of polypyrrolidone with the activators of this invention, the monomer containing the catalyst is dispersed in a known solvent therefor, such as petroleum ether, containing an emulsifying agent. Subsequently, the desired activator is added to the dispersion and the reaction mixture is subjected to polymerization conditions. A suitable coagulant is then added to the polymerized mixture in order to precipitate the polymer. A suitable emulsifying agent which may be employed is sodium lauryl sulfate and a suitable coagulant is phosphoric acid.

While it is not positively known exactly what takes place when pyrrolidone is polymerized in accordance with the present invention, it is believed that the polymerization is accomplished by first forming ionic pyrrolidone salts. For example, when one employs sodium hydroxide as a catalyst, a reversible reaction takes place between the monomeric pyrrolidone molecules and the hydroxide ion with the subsequent formation of water. Since this reaction is reversible, it is necessary that the water be removed in order to carry out polymerization. Formation of the pyrrolidone anion results in an electron distribution which is nucleophilic. In order for chain propagation to take place, the neucleophilic ion attaches to a pyrrolidone ring which has been activated by an activator molecule, thereby causing a weak bond in the ring between the nitrogen and the carbonyl group and causing the ring to open, forming a newly activated position and an anion on the polymer chain. A proton (hydrogen ion) from a monomeric pyrrolidone transfers to the chain anion resulting in a silazine linkage and the regeneration of a nucleophilic pyrrolidone anion to further catalyze the reaction. The catalyst is continuously consumed and generated throughout the entire reaction by the transfer of a proton (hydrogen ion) giving rise to the formation of the pyrrolidone anion. It is believed that the function of an activator is to activate the pyrrolidone monomer by displacing the hydrogen on the nitrogen atom of the pyrrolidone ring, thereby causing an electrophilic state within the monomeric pyrrolidone molecule, such that the bond between the nitrogen atom and the carbonyl group of the molecule is broken when such molecule is attacked by a pyrrolidone anion, thereby forming a straight chain. Such chain is attached to a pyrrolidone ring by bonding to the nitrogen atom therein and the ring structure is in turn opened by the attack of a nucleophilic pyrrolidone ion formed by the transfer of a proton from a monomeric pyrrolidone molecule to a chain nitrogen. Irrespective of whether or not the above theory is correct, the use of the activators defined herein, to activate the polymerization of pyrrolidone, has produced unexpectedly good results. For example, as may be seen from the data in the following examples, there is a distinctive difference in the strength of the silazine bonds and the benzamide bonds. On washing, a large portion of the former, that is the silazine bonds, are hydrolyzed, whereas the latter are not. This hydrolysis of the silazine bond results in the formation of amine end groups on the polymer. Consequently, as one would expect, there is a greater increase in the dyeability with acid dyes of polypyrrolidone prepared with the silicon containing activators of this invention than those activated by the known carbonyl activators, such as benzoyl chloride, the latter leading to stable amide linkages.

Polypyrrolidone prepared with the activators of this invention has a melting point of about 260° C. and is soluble in formic acid, mixtures of formic acid and water, and all the known solvents for polypyrrolidone. It is particularly adapted for use in the manufacture of shaped articles, such as filaments, fibers, films, rods, bristles and the like. Lower molecular weight polymers prepared in the same manner may be employed in the manufacture of coatings or lacquers. Various methods are known for spinning fibers from the polypyrrolidone prepared with the activators of this invention. These methods include the melt spinning, dry spinning and wet spinning methods. Where the wet spinning method is employed, the polymer is dissolved in a suitable solvent and subsequently spun from the solution into a coagulating bath. In the dry spinning method, the polymer is dissolved in a volatile solvent and extruded into a heated atmosphere in order to remove the solvent. The melt spinning method involves melting the polymer under temperature and pressure and extruding the melt through a spinneret into the atmosphere.

Shaped articles which have a modified appearance or modified properties may be prepared from the polypyrrolidones prepared with the activators of the present invention by use of various reagents to accomplish the desired effect. Such agents include plasticizers, pigments, dyes, anti-static agents, fire-retarding agents and the like.

The following examples are intended to illustrate the invention more fully but are not intended to limit the scope thereof, for it is possible to effect many modifications therein. In the examples, all parts and percents are by weight unless otherwise indicated.

Example I

To a 25 gram (0.294 mole) sample of pyrrolidone containing 0.08 percent moisture by weight, there was added under a nitrogen atmosphere 0.25 gram (0.0104 mole) of sodium hydride catalyst. When the evolution of hydrogen gas was completed, 0.50 gram (0.00294 mole) of tetrachlorosilane was added to the reaction mixture. This mixture was stoppered to protect it against the atmosphere and permitted to stand for 24 hours at about 25° C. The polymer was recovered by breaking up the cake, grinding it in a Wiley mill and washing the powder first with water, then acetone in a Waring Blendor. The polymer was subsequently air-dried to constant weight. 15.5 grams or a 67 percent yield of polymer was recovered. The polymer had a specific viscosity, determined on 0.5 percent solutions of the polymer in 90 percent formic acid, of 1.664. A control sample prepared under the same conditions with monomer from the same batch but in the presence of catalyst alone resulted in 1.2 grams or a 5 percent yield of recovered polymer having a specific viscosity of only 0.410. A further sample of polypyrrolidone prepared using monomer from the same batch under the same conditions, but with 0.41 gram (0.00294 mole) of benzoyl chloride activator, in addition to sodium hydride catalyst, resulted in 17.5 grams of polymer or a 71 percent yield having, however, a specific viscosity of only 0.764. The polymer prepared with the benzoyl chloride had a yellowish tint whereas the tetrachlorosilane activator polymer was a pure white. The differences in color are readily noticeable by visual inspection. Upon standing for several weeks, the benzoyl chloride activated polymer changed color noticeably becoming even more yellow. On the other hand, the tetrachlorosilane activator polymer still retained a good white color. The comparative results are set forth in the table below.

| Activator | Grams used | Ml. | Weight of polymer recovered, g. | Percent yield | Sp. vis. 0.5% conc. |
|---|---|---|---|---|---|
| Control | | | 1.2 | 5 | 0.410 |
| Benzoyl chloride | 0.41 | 0.34 | 17.5 | 71 | 0.764 |
| Tetrachlorosilane | 0.50 | 0.33 | 15.5 | 67 | 1.664 |

Example II

To a 25 gram (0.294 mole) sample of pyrrolidone from the same batch used in Example I, containing 0.08 percent moisture by weight, there was added under a nitrogen atmosphere 0.25 gram (0.0104 mole) of sodium hydride catalyst. When the evolution of hydrogen gas was completed 0.38 gram (0.00294 mole) of dimethyldichlorosilane was added to the reaction mixture. This mixture was stoppered to protect it from the atmosphere and permitted to stand for 24 hours at about 25° C. The polymer was recovered by breaking up the cake, grinding it in a Wiley mill and washing the powder first with water and then with acetone in a Waring Blendor. The polymer was subsequently air-dried to constant weight. 8.4 grams or a 34 percent yield of polymer was recovered. The polymer had a specific viscosity, determined on 0.5 percent solutions of the polymer in 90 percent formic acid, of 1.301. This sample was compared with the control sample and with the sample prepared in the presence of benzoyl chloride activator set forth under Example I. The polymer prepared with the benzoyl chloride had a yellow tint whereas the dimethyldichlorosilane activator polymer was pure white. The differences in color are readily noticeable by visual inspection. Upon standing for several weeks, the benzoyl chloride activator polymer changed color noticeably, becoming even more yellow. On the other hand, the dimethyldichlorosilane activator polymer still retained a good white color. The results are tabulated below.

| Activator | Grams used | Ml. | Weight of polymer recovered, g. | Percent yield | Sp. vis. 0.5% conc. |
|---|---|---|---|---|---|
| Control | | | 1.2 | 5 | 0.410 |
| Benzoyl chloride | 0.41 | 0.34 | 17.5 | 71 | 0.764 |
| Dimethyldichlorosilane | 0.38 | 0.36 | 8.4 | 34 | 1.301 |

Example III

To a 25 gram (0.294 mole) sample of pyrrolidone from the same batch used in prior samples, containing 0.08 percent moisture by weight, there was added under a nitrogen atmosphere 0.25 gram (0.0104 mole) of sodium hydride catalyst. When the evolution of hydrogen gas was completed 0.48 (0.00294 mole) of chloromethyldichlorosilane was added to the reaction mixture. This mixture was stoppered to protect it from the atmosphere and permitted to stand for 24 hours at about 25° C. The polymer was recovered by breaking up the cake and washing the powder first with water and then with acetone in a Waring Blendor. The polymer was subsequently air-dried to constant weight. 4.1 grams or a 17 percent yield of polymer was recovered. The polymer had a specific viscosity, determined on 0.5 percent solutions of the polymer in 90 percent formic acid, of 0.971. This sample was compared with the control sample and with the sample prepared in the presence of benzoyl chloride activator set forth under Example I. The polymer prepared with the benzoyl chloride had a yellowish tint whereas the chloromethylmethyldichlorosilane activator polymer was a pure white. The differences in color are readily noticeable by visual inspection. Upon standing for several weeks, the benzoyl chloride activator polymer changed color noticeably, becoming even more yellow. On the other hand, the chloromethylmethyldichlorosilane activator polymer still retained a good white color. The results are tabulated below.

| Activator | Grams used | Ml. | Weight of polymer recovered, g. | Percent yield | Sp. vis. 0.5% conc. |
|---|---|---|---|---|---|
| Control | | | 1.2 | 5 | 0.410 |
| Benzoyl chloride | 0.41 | 0.34 | 17.5 | 71 | 0.764 |
| Chloromethylmethyldichlorosilane | 0.48 | 0.38 | 4.1 | 17 | 0.971 |

Example IV

To a 25 gram (0.294 mole) sample of pyrrolidone from the same batch used in prior examples, containing 0.08 percent moisture by weight, there was added under a nitrogen atmosphere 0.25 gram (0.0104 mole) of sodium hydride catalyst. When the evolution of hydrogen gas was completed 0.75 gram (0.00294 mole) of diphenyldichlorosilane was added to the reaction mixture. This mixture was stoppered to protect it from the atmosphere and permitted to stand for 24 hours at about 25° C. The polymer was recovered by breaking up the cake, grinding it in a Wiley mill, and washing the powder first with water and then with acetone in a Waring Blendor. The polymer was subsequently air-dried to constant weight. 9.7 grams or a 39 percent yield of polymer was recovered. The polymer had a specific viscosity, determined on 0.5 percent solutions of the polymer in 90 percent formic acid, of 1.710. This sample was compared with the control sample and with the sample prepared in the presence of benzoyl chloride activator set forth under Example I. The polymer prepared with the benzoyl chloride had a yellowish tint whereas the diphenyldichlorosilane activator polymer was a pure white. The differences in color are readily noticeable by visual inspection. Upon standing for several weeks, the benzoyl chloride activator polymer changed color noticeably, becoming even more yellow. On the other hand, the diphenyldichlorosilane activator polymer still retained a good white color. The results are tabulated below.

| Activator | Grams used | Ml. | Weight of polymer recovered, g. | Percent yield | Sp. vis. 0.5% conc. |
|---|---|---|---|---|---|
| Control | | | 1.2 | 5 | 0.410 |
| Benzoyl chloride | 0.41 | 0.34 | 17.5 | 71 | 0.764 |
| Diphenyldichlorosilane | 0.74 | 0.61 | 9.7 | 39 | 1.710 |

*Example V*

To a 25 gram (0.294 mole) sample of pyrrolidone from the same batch used in prior examples, containing 0.08 percent moisture by weight, there was added under a nitrogen atmosphere 0.75 gram (0.0312 mole) of sodium hydride catalyst. When the evolution of hydrogen gas was completed 0.50 gram (0.00294 mole) of tetrachlorosilane was added to the reaction mixture. This mixture was stoppered to protect it against the atmosphere and permitted to stand for 24 hours at about 25° C. The polymer was recovered by breaking up the cake, grinding a portion of it in a Wiley mill and washing the powder first with water and then with acetone in a Waring Blendor. The polymer was subsequently air-dried to constant weight. 16.9 grams or a 71 percent yield of polymer was recovered, based on 23.9 grams of the cake that was worked up. The polymer has a specific viscosity, determined on 0.5 percent solutions of the polymer in 90 percent formic acid, of 1.922. A further sample of polypyrrolidone prepared under the same conditions but with 0.411 gram (0.00294 mole) of benzoyl chloride activator resulted in 6.9 grams of polymer or a 66 percent yield, based on 10.4 grams of the polymer cake that was worked up; the specific viscosity was only 1.375. The benzoyl chloride activator polymer had a yellowish tint whereas the tetrachlorosilane polymer had a bright white color. The color differences were clearly noticeable on visual inspection. Upon standing for several weeks the benzoyl chloride activator polymer became even more yellow; however, the tetrachlorosilane polymer retained this white color.

| Activator | Grams used | Ml. | Weight of polymer recovered, g. | Percent yield | Sp. vis. 0.5% conc. |
|---|---|---|---|---|---|
| Benzoyl chloride | 0.411 | 0.34 | *6.9 | 66 | 1.375 |
| Tetrachlorosilane | 0.50 | 0.33 | *16.9 | 71 | 1.922 |

* From 10.4 and 23.9 grams respectively of the polymer cakes worked up.

*Example VI*

To a 25 gram (0.294 mole) sample of pyrrolidone from the same batch used in prior examples, containing 0.08 percent moisture by weight, there was added under a nitrogen atmosphere 0.75 gram (0.0312 mole) of sodium hydride catalyst. When the evolution of hydrogen gas was completed 0.475 gram (0.00294 mole) of vinyltrichlorosilane was added to the reaction mixture. This mixture was stoppered to protect it from the atmosphere and permitted to stand for 24 hours at about 25° C. The polymer was recovered by breaking up the cake, grinding it in a Wiley mill and washing the powder first with water and then with acetone in a Waring Blendor. The polymer was subsequently air-dried to constant weight. 17.9 grams of a 72 percent yield of polymer was recovered. The polymer had a specific viscosity, determined on 0.5 percent solutions of the polymer in 90 percent formic acid, of 2.001. This sample was compared with a sample prepared in the presence of benzoyl chloride activator set forth under Example V. The polymer prepared with the benzoyl chloride had a yellowish tint whereas the vinyltrichlorosilane activator polymer was a pure white. The differences in color are readily noticeable by visual inspection. Upon standing for several weeks, the benzoyl chloride activator polymer changed color noticeably, becoming even more yellow. On the other hand, the vinyltrichlorosilane activator polymer still retained a good white color. The results are tabulated below.

| Activator | Grams used | Ml. | Weight of polymer recovered, g. | Percent yield | Sp. vis. 0.5% conc. |
|---|---|---|---|---|---|
| Benzoyl chloride | 0.411 | 0.34 | *6.9 | 66 | 1.375 |
| Vinyltrichlorosilane | 0.475 | 0.38 | 17.9 | 72 | 2.001 |

* From 10.4 grams of the polymer cake worked up.

*Example VII*

To 132 grams of monomeric pyrrolidone which had a moisture content of 0.02 percent and had been purified by recrystallization three times, there was added 5.56 grams of 85 percent potassium hydroxide, equivalent to 4.72 grams or 0.084 mole of pure potassium hydroxide. Water of reaction and pyrrolidone were then stripped from the reaction mixture by a vacuum distillation at 2 mm. of mercury until there was a residue of 103 grams of monomeric pyrrolidone and potassium pyrrolidone. This residue contained 1.176 moles of monomeric pyrrolidone of which 0.084 mole was in the form of its potassium derivative. This solution was divided into four equal parts, each containing 25.75 grams (0.294 mole) of monomeric pyrrolidone of which 0.021 mole was in the form of its potassium derivative.

One part was allowed to sit at 25° C. for 24 hours with no activator added thereto. A small amount of slushy polymer was obtained. It was filtered, washed with water, then acetone, and finally air-dried. The yield was 1.0 gram or 4 percent of the theoretical yield.

To another portion there was added with shaking 0.380 ml. (0.475 gram or 0.00294 mole) of vinyltrichlorosilane. The reaction mixture became warm and set up to a semi-solid in 8 minutes. After 24 hours at 25° C., the reaction mixture was a very hard solid, pure white cake. The polymer was recovered by breaking up the cake, grinding it in a Wiley mill, and washing the powder first was water, then acetone in a Waring Blendor. The powder was filtered after each washing. The polymer was air-dried to constant weight. The yield was 19.4 grams or 78 percent of the theoretical yield of 25.0 grams. The polymer has a specific viscosity, determined on 0.5 percent solution of the polymer in 90 percent formic acid, of 1.054. The silane activated polymer had a good white color in comparison to a somewhat yellowish tinge exhibited by the polymer prepared without any activator.

| Activator | Grams used | Ml. | Weight of polymer recovered, g. | Percent yield | Sp. vis. 0.5% conc. |
|---|---|---|---|---|---|
| Control | | | 1.0 | 4 | |
| Vinyltrichlorosilane | 0.475 | 0.380 | 19.4 | 78 | 1.054 |

*Example VIII*

To a 1 gram sample of polypyrrolidone prepared in a polymerization wherein vinyltrichlorosilane was employed to activate polymerization, there was added 10 ml. of water and 0.2 ml. glacial acetic acid. Another sample prepared from the same batch of monomer but activated with benzoyl chloride was also treated in the same manner. The mixtures were brought under reflux and an aqueous solution of an acid dye, Calcocid Alizarin 121

Blue SAPX C.I. Acid Blue 45; C.I. No. 63010, was added incrementally to each mixture. Each milliliter of the dye solution contained 0.4 mg. of dye. In each case the dye solution was added until an excess of dye was maintained in the mixture on continued refluxing. Refluxing was then continued for 45 minutes after the last portion of the dye solution was added. The polymers were filtered and the filtrates diluted to 50 ml. in Nessler tubes. Solutions of comparable dye depths prepared in Nessler tubes by trial and error using the stock dye solution showed that the silane halide activated polymer had absorbed the dye from 18.5 ml. of the stock dyestuff solution. On the other hand, the benzoyl chloride activated polymer absorbed the dye from only 8 ml. of the stock dye solution. Thus, the vinyltrichlorosilane activated polymer took up more than twice as much dye and upon visual inspection it had a much darker shade of blue than the benzoyl chloride activated polymer.

To each of the filtered polymers there was added 20 ml. of water and 0.5 ml. of concentrated ammonium hydroxide. The mixtures were boiled for 10 minutes and the polymers were again filtered. The filtrates were diluted to 100 ml. in Nessler tubes and comparable solutions were prepared from the stock dye solution. The silane halide activated polymer retained the dye of 8.5 ml. of dye solution and the benzoyl chloride activated polymer retained the dye of only 4.5 ml. Likewise, physical examination of the two polymers themselves showed that the silane halide activated polymer was dyed a considerably deeped shade than the benzoyl chloride activated polymer. Pertinent data on the polymer and the dyeing results are tabulated below.

| Activator | Sp. vis. at 0.5% conc. in 90% HCOOH | Dye absorbed (expressed in ml. of dye sol'n. exhausted) | Dye remaining on polymer after NH$_4$OH washing (expressed in ml. of dye sol'n. exhausted) |
|---|---|---|---|
| Vinyltrichlorosilane | 2,001 | 18.5 | 8.5 |
| Benzoyl chloride | 1.375 | 8.0 | 4.5 |

Example IX

To 0.50 gram samples of each, a vinyltrichlorosilane activated polypyrrolidone and a butyrolactone activated polypyrrolidone, there was added 10 ml. of water, 0.2 ml. of 98 percent formic acid and 10 ml. of the same acid dye solution used in Example VIII. Each mixture was boiled until no further visual change was evident. The dye in the mixture containing the vinyltrichlorosilane activated polypyrrolidone was completely exhausted. However, there was still appreciable dye remaining in the mixture containing the butyrolactone activated polypyrrolidone. Subsequently, 10 ml. more of dye solution was added in 5 ml. increments to the mixture containing the vinyltrichlorosilane activated polymer. This mixture was boiled until no further change was noted visually. Then both polymer samples were filtered and the filtrates were diluted to 50 ml. in Nessler tubes. Solutions of comparable dye depth were made by trial and error from the stock dye solution. The results showed that the vinyltrichlorosilane activated polymer had absorbed the dye that would be contained in 18 ml. of stock dye solution and the butyrolactone activated polymer had absorbed the dye that would be contained in only 8 ml. of the dye solution. Visual examination of the polymers themselves showed that the vinyltrichlorosilane activated polymer was considerably more deeply dyed than the butyrolactone activated polymer. Pertinent data on the polymers and the dyeing results are tabulated below.

| Activator | Sp. Vis. at 0.5% conc. in 90% HCOOH | Dye absorbed (expressed in ml. of dye soln. exhausted) |
|---|---|---|
| Vinyltrichlorosilane | 0.541 | 18 |
| Butyrolactone | 0.431 | 8 |

Example X

To a 0.50 gram sample of polypyrrolidone having a specific viscosity of 1.664 prepared in a polymerization wherein silicon tetrachloride was employed as an activator, there was added 10 ml. of water, 0.2 ml. of glacial acetic acid and 5.0 ml. of an aqueous solution of Calcocid Alizarin 121 Blue SAPX C.I. Acid Blue 45; C.I. No. 63010 (concentration of the dye solution being 0.53 mg. of dye per ml. of water). A like sample of polypyrrolidone having a specific viscosity of 0.764 which had been activated by benzoyl chloride was treated in the same manner. Each mixture was brought to a boil for 15 seconds and thereafter filtered. The silicon tetrachloride activated polymer exhausted the dye bath completely. On the other hand, the benzoyl chloride activated polymer did not. The polymer which had been activated with silicon tetrachloride was dyed a deep blue in comparison to a somewhat weak blue for the benzoyl chloride activated polypyrrolidone. The differences in the blue shade were readily discernible on visual inspection of the polymers themselves.

To each polymer there was then added 25 ml. of water and 0.5 ml. of concentrated ammonium hydroxide. The mixtures were brought to a vigorous boil for 15 seconds and filtered. The silicon tetrachloride activated polymer remained deeply dyed, whereas the benzoyl chloride activated polymer did not appear to retain an appreciable amount of dye. Both polymers employed in this example were prepared from the same batch of monomer.

Example XI

To 0.50 gram samples of each, a vinyltrichlorosilane activated polypyrrolidone (specific viscosity, 0.541) and a benzoyl chloride activated polypyrrolidone (specific viscosity, 1.350) there was added 10 ml. of water, 0.2 ml. of glacial acetic acid and 8.5 ml. of the same acid dye solution used in Example X above. Each mixture was boiled vigorously for 15 seconds and then filtered. The vinyltrichlorosilane activated polymer completely exhausted the dye from the dye bath whereas the dye in the other bath containing the benzoyl chloride activated polymer was far from exhausted. Visual inspection of the polymers showed that the vinyltrichlorosilane activated polymer was much more deeply dyed than the benzoyl chloride activated polypyrrolidone.

To each of the filtered polymers there was added 25 ml. of water and 0.5 ml. of concentrated ammonium hydroxide. The mixtures were again boiled vigorously for 15 seconds and then filtered. The vinyltrichlorosilane activated polymer remained deeply dyed, whereas the benzoyl chloride activated polypyrrolidone retained only a small amount of the dye that had been absorbed. The differences in dye remaining on the polymer were readily discernible by visual inspection.

The new activators of the present invention present many advantages over the prior art. For example, polymers having a greatly increased specific viscosity and a much whiter color can be prepared by employing the silane activators of this invention. Furthermore, extremely good yields are obtained in polymerizations where the new activators are used. Another distinct advantage exhibited by the new activators of this invention is the greatly increased dyeability of polypyrrolidone prepared from polymerizations in which they are employed. At the same time that the new activators result in the formation of polymers having greatly improved properties such as dyeability, increased specific viscosity, and the like, the other physical characteristics of the polypyrrolidone, such as solubility, for example, are not affected. The use of the silicon containing activators of this invention decreases materially the amount of time necessary to carry a pyrrolidone polymerization to completion. Furthermore, the new activator compounds of this invention are readily available and inexpensive and may be employed without substantial changes in existing equipment used in pyrrolidone polymerization. Numerous other advantages will be apparent to those skilled in the art.

As many apparently widely different embodiments of this invention may be made without departing from the spirit and scope thereof, it is to be understood that the same is not to be limited to the specific embodiments thereof except as defined in the appended claims.

I claim:

1. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals, alkyl and aryl salts of alkali metals, hydroxides and oxides of alkali metals, and a polymerization activator containing at least one silicon-halogen bond selected from the group consisting of halo-silanes; halo-substituted and unsubstituted, saturated and unsaturated lower alkyl halo-silanes, and halo-substituted and unsubstituted lower alkyl substituted aromatic halo-silanes, said activator being employed in a range of 0.0001 to 0.075 chemical equivalent of activator said chemical equivalent being based upon the gram-molecular weight of said activator divided by the number of silicon-halogen bonds in said activator, based upon one mole of monomeric pyrrolidone and said catalyst being employed in a range of 0.002 to 0.25 chemical equivalent, said chemical equivalent being based on the gram-molecular weight of said catalyst divided by the valence of the metal in said catalyst, of catalyst based upon one mole of monomeric pyrrolidone with a slight excess of catalyst over activator being present in said mixture, and subjecting said mixture to a temperature in a range of −70° C. to 100° C.

2. The process as defined in claim 1 wherein the catalyst is sodium hydride.

3. The process as defined in claim 1 wherein the catalyst is potassium hydroxide.

4. The process as defined in claim 1 wherein the catalyst is sodium pyrrolidone.

5. The process as defined in claim 1 wherein the catalyst is sodium phenyl.

6. The process as defined in claim 1 wherein the catalyst is sodium hydroxide.

7. The process as defined in claim 1 wherein any water which is formed during the reaction is completely removed by vacuum distillation before the addition of the polymerization activator.

8. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals, alkyl and aryl salts of alkali metals, hydroxides and oxides of alkali metals, and an inorganic polymerization activator containing at least one silicon-halogen bond selected from the halo-silanes, said activator being employed in a range of 0.0001 to 0.075 chemical equivalent, said chemical equivalent being based upon the gram-molecular weight of said activator divided by the number of silicon-halogen bonds in said activator, of activator based upon one mole of monomeric pyrrolidone and said catalyst being employed in a range of 0.002 to 0.25 chemical equivalent, said chemical equivalent being based upon the gram-molecular weight of said catalyst divided by the valence of the metal in said catalyst, of catalyst based upon one mole of monomeric pyrrolidone with a slight excess of catalyst over activator being present in said mixture, and subjecting said mixture to a temperature in a range of −70° C. to 100° C.

9. The process as defined in claim 8 wherein the polymerization activator is tetrachlorosilane.

10. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals, alkyl and aryl salts of alkali metals, hydroxides and oxides of alkali metals, and an organic polymerization activator containing at least one silicon-halogen bond, the remaining bonds being silicon-carbon selected from the group consisting of halo-substituted and unsubstituted, saturated and unsaturated lower alkyl halo-silanes and halo-substituted and unsubstituted lower alkyl substituted aromatic halo-silanes, said activator being employed in a range of 0.0001 to 0.075 chemical equivalent, said chemical equivalents being based upon the gram-molecular weight of said activator divided by the number of silicon-halogen bonds in said activator, of activator based upon one mole of monomeric pyrrolidone and said catalyst being employed in a range of 0.002 to 0.25 chemical equivalent, said chemical equivalent being based on the gram-molecular weight of said catalyst divided by the valence of the metal in said catalyst, of catalyst based upon one mole of monomeric pyrrolidone with a slight excess of catalyst over activator being present in said mixture, and subjecting said mixture to a temperature in a range of −70° C. to 100° C.

11. The process as defined in claim 10 wherein the polymerization activator is dimethyldichlorosilane.

12. The process as defined in claim 10 wherein the polymerization activator is chloromethylmethyldichlorosilane.

13. The process as defined in claim 10 wherein the polymerization activator is diphenyldichlorosilane.

14. The process as defined in claim 10 wherein the polymerization activator is vinyltrichlorosilane.

15. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals, alkyl and aryl salts of alkali metals, hydroxides and oxides of alkali metals, and a polymerization activator containing at least one silicon-halogen bond selected from the group consisting of halo-silanes; halo-substituted and unsubstituted, saturated and unsaturated lower alkyl halo-silanes, and halo-substituted and unsubstituted lower alkyl substituted aromatic halo-silanes, said activator being employed in a range of 0.001 to 0.075 chemical equivalent, said chemical equivalent being based upon the gram-molecular weight of said activator divided by the number of silicon-halogen bonds in said activator, of activator based upon one mole of monomeric pyrrolidone and said catalyst being employed in a range of 0.005 to 0.25 chemical equivalent, said chemical equivalent being based on the gram-molecular weight of said catalyst divided by the valence of the metal in said catalyst, of catalyst based upon one mole of monomeric pyrrolidone with a slight excess of catalyst over activator being present in said mixture, and subjecting said mixture to a temperature in a range of 20° C. to 70° C.

16. The process as defined in claim 15 wherein any water which is formed during the reaction is completely removed by vacuum distillation before the addition of the activator.

17. The process as defined in claim 15 wherein the polymerization activator is vinyltrichlorosilane.

18. The process as defined in claim 15 wherein the polymerization activator is tetrachlorosilane.

19. A process for polymerizing pyrrolidone which comprises forming under essentially anhydrous conditions a mixture containing 0.294 mole of monomeric pyrrolidone, and 0.021 chemical equivalent, said chemical equivalent being based upon the gram-molecular weight of potassium hydroxide divided by the valence of potassium, of potassium hydroxide, reacting said mixture by subjecting the same to a temperature to 25° C. and removing the water which is formed during the reaction by vacuum distillation, adding 0.00882 chemical equivalent, said chemical equivalent being based upon the gram-molecular weight of vinyltrichlorosilane divided by the number of silicon-halogen bonds in vinyltrichlorosilane, of vinyltrichlorosilane to the reaction mixture, and thereafter maintaining the reaction mixture at a temperature of 25° C.

20. A process for polymerizing pyrrolidone comprising forming under essentially anhydrous conditions a mixture containing 0.00882 chemical equivalent, said chemical equivalent being based upon the gram-molecular weight of vinyltrichlorosilane divided by the number of silicon-halogen bonds in vinyltrichlorosilane, of vinyltrichlorosilane, 0.294 mole of monomeric pyrrolidone and 0.0312 chemical equivalent, said chemical equivalent being based upon the gram-molecular weight of sodium hydride divided by the valence of sodium, of sodium hydride and subjecting said mixture to a temperature of 25° C.

21. A process for preparing polypyrrolidone which comprises polymerizing pyrrolidone under substantially anhydrous conditions in the presence of a catalystic amount of an alkali metal salt of pyrrolidone as catalyst and a promoting amount of a compound selected from the group consisting of halo-silanes; hydrocarbon substituted halo-silanes and halogen containing hydrocarbon substituted halo-silanes as activator and allowing the pyrrolidone to polymerize to a solid polymer.

References Cited by the Examiner
UNITED STATES PATENTS 2,739,959   3/56   Ney et al. _____ 260—78

WILLIAM H. SHORT, *Primary Examiner.*

MILTON STERMAN, H. N. BURSTEIN, P. E. MANGAN, *Examiners.*